US006893262B2

(12) United States Patent
Stockman (10) Patent No.: US 6,893,262 B2
(45) Date of Patent: May 17, 2005

(54) GAUGE SIMULATOR (76) Inventor: Gregg Stockman, 669 Berville Rd., Allenton, MI (US) 48002

( * ) Notice: Subject to any disclaimer, the term of this patent is extended or adjusted under 35 U.S.C. 154(b) by 0 days.

(21) Appl. No.: 10/143,261

(22) Filed: May 9, 2002

(65) Prior Publication Data

US 2002/0187459 A1 Dec. 12, 2002

Related U.S. Application Data

(60) Provisional application No. 60/296,362, filed on Jun. 6, 2001.

(51) Int. Cl.[7] .............................................. G09B 9/08
(52) U.S. Cl. ............................ 434/29; 434/45; 434/49; 434/30; 434/35
(58) Field of Search ............................... 434/45, 29, 49

(56) References Cited

U.S. PATENT DOCUMENTS 3,471,942 A * 10/1969 Weitzman et al. .......... 434/325
4,425,097 A * 1/1984 Owens ....................... 434/219
4,599,070 A * 7/1986 Hladky et al. ............... 434/45
4,673,356 A * 6/1987 Schmidt ...................... 434/35

* cited by examiner

Primary Examiner—Derris H. Banks
Assistant Examiner—Dmitry Suhol
(74) Attorney, Agent, or Firm—Gifford, Krass, Groh, Sprinkle, Anderson & Citkowski, P.C.

(57) ABSTRACT

A device is disclosed for training pilots by simulating the operation of gauges in aircraft. The self-contained device can be installed into training aircraft to be used during instruction. Alternatively, the device can be used during classroom and ground school training. A switch box control panel simulates the controls and indicators of aircraft. A logic circuit and program simulate normal operations and common malfunctions of aircraft. During malfunctions the program and circuit will evaluate the pilot's corrective control input, continuing the malfunction if the pilot's response is incorrect. The device's ability to accept inputs and to emulate characteristics of specific aircraft increases the realism of the simulation and training.

9 Claims, 6 Drawing Sheets

Subroutine: *User Selections*

Fig. 3

Note: All user responses during this subroutine are limited to approximately 10 seconds.
Processing return to the next program instruction in the main program loop if this limit is exceeded.

Fig. 4

Subroutine: *Simulation #1, Loss of Fuel (one tank)*

Fig. 5

Subroutine: *Simulation #2, Loss of Fuel (both tanks)*

Fig. 6

Subroutine: *Simulation #3, Fuel Selector Failure*

Fig. 7

Subroutine: *Simulation #4, Failure After Changing Fuel*

Fig. 8

Subroutine: *Simulation #5, Low Oil Pressure*

Fig. 9

Subroutine: *Simulation #6, High Oil Temperature*

Fig. 10

Subroutine: *Simulation #7, Low Voltage and Low Amps*

Fig. 11

Subroutine: *Simulation #8, High Voltage and High Amps*

GAUGE SIMULATOR

RELATED APPLICATION

This application claims priority of U.S. Provisional Patent Application No. 60/296,362 filed Jun. 6, 2001 and is incorporated herein by reference.

BACKGROUND OF THE INVENTION

I. Field of the Invention

The present invention relates generally to aircraft control simulators and trainers, and particularly it simulates gauges and controls of aircraft and trains a pilot by evaluating their response to common malfunction scenarios.

II. Description of the Prior Art

It is important for pilots to regularly and routinely scan their gauges while operating aircraft. However, because of the manner in which pilots are currently trained, many do not bother to scan their gauges often enough, nor are they familiar with the appropriate methods for solving system malfunctions indicated by irregular gauge readings.

Contemporary training aircraft are not modified to supply indications of system malfunction, as the responses to such simulated malfunctions could result in real dangers. Rather, flight instructors customarily announce a hypothetical system malfunction while simultaneously disabling something on the aircraft. This too exposes the pilot, flight instructor, and aircraft to risk or harm.

The primary disadvantage to pilot training in aircraft is the safety risk involved in training in an unfamiliar aircraft. This is presumably one of the reasons that the FAA has reversed its stance against flight simulators.

A further disadvantage of prior training methods is the expense incurred by such training. Aircraft have high purchase, maintenance and insurance costs.

SUMMARY OF THE PRESENT INVENTION

The present invention provides a flight gauge simulator and trainer which overcomes all of the above-mentioned disadvantages of the previous methods of training.

In brief, the apparatus of the present invention utilizes a control panel, comprised of switches, gauges and a liquid crystal display, which simulates the flight gauges and controls of a typical aircraft and accepts pilot input. A logic circuit and program indicate oil pressure, oil temperature, fuel levels, and electrical readings. Additionally, the logic circuit and program provide malfunction indications noticeable on the gauges and evaluates pilot corrective inputs.

The control panel contains a plurality of gauges to alert the pilot trainee of a malfunction. The control panel also contains a liquid crystal display and pushbutton switches capable of changing the fuel source tank, adjusting fuel levels, and accepting control inputs.

The control panel and the control panel circuit comprise the switch box. The circuit itself is a straightforward logic circuit based on a program which allows it to simulate flight gauges and fuel tank operation, generate malfunction indications and evaluate whether the pilot trainee has made the correct response to that malfunction.

The program itself consists of a series of discrete routines for operation of the device when providing normal gauge indication and when providing malfunction indications. When providing malfunction indications, the device subjects the pilot trainee to eight different types of malfunction indications based on the subroutines in the program.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1A:
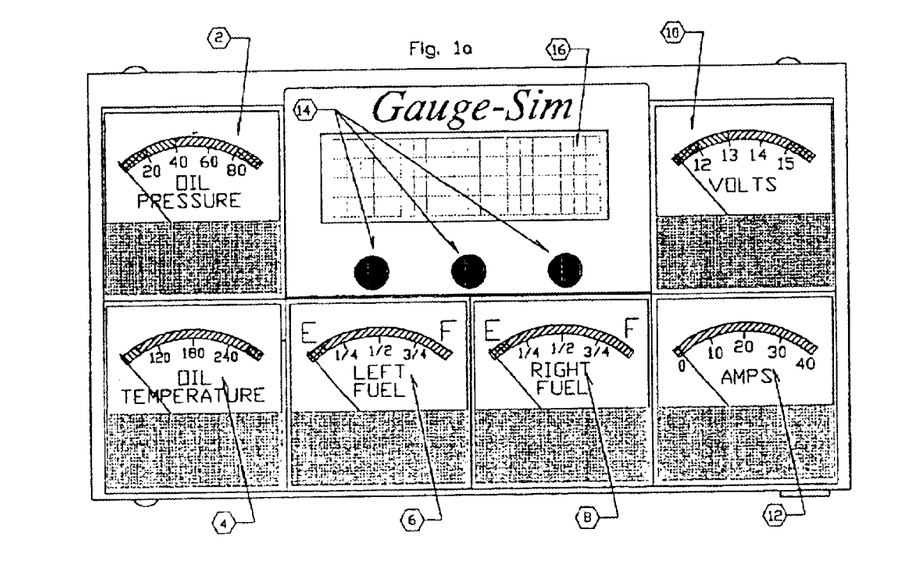
FIG. 1a is a front view of the control box and switch illustrating the preferred embodiment of the present invention.

FIG. 1a is the pilot's view of the switch box control panel of the present invention while in use. This control panel simulates the gauges and control panel of an aircraft and contains all of the switches and gauges used by a pilot to monitor and operate the fuel tanks. Additionally, the control panel simulates gauges associated with an aircraft's oil and electrical systems.

Oil pressure gauge 2 displays a simulation of the oil pressure of the aircraft's engine. Oil temperature gauge 4 displays a simulation of the temperature of the aircraft's engine. Left fuel gauge 6 and right fuel gauge 8 each display a simulation of the level of fuel each respective tank is carrying. Voltmeter 10 displays a simulation of the voltage in the aircraft's electrical system. Ammeter 12 displays a simulation of a charge rate in the aircraft's electrical system.

FIG. 1a also shows where the liquid crystal display 16 and the three input buttons 14 can be accessed. A flight instructor may use these three input buttons 14 to program the simulator to perform one of nine simulations, eight of which provide malfunction indications. Additionally, a pilot trainee or a flight instructor may use these three input buttons 14 to change the fuel source tank and adjust the fuel levels. The menus displayed on the liquid crystal display 16 guide the pilot trainee or the flight instructor step-by-step through all selections.

Figure 1B:
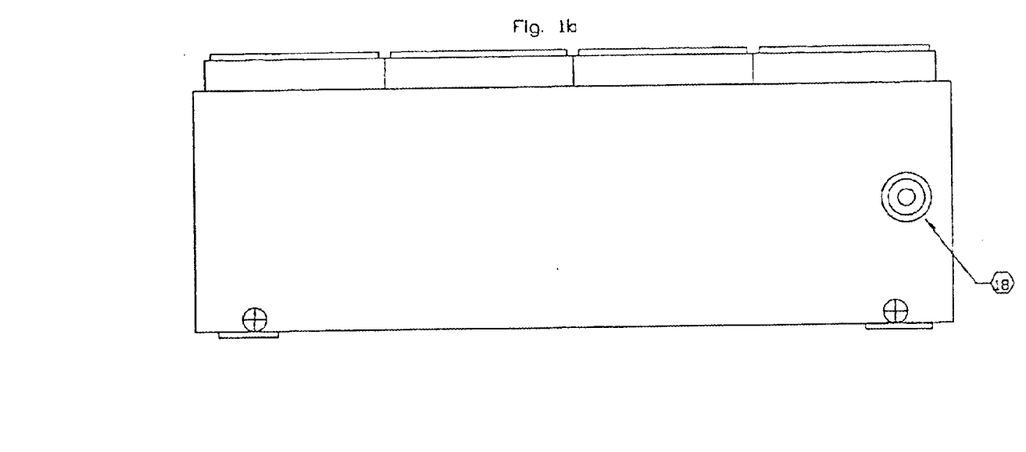
FIG. 1b is a bottom view of the switch box control panel illustrating the preferred embodiment of the present invention.

FIG. 1b is a bottom view of the switch box control panel of the present invention. Shown in this view is a coaxial power jack 18 used for recharging the internal batteries.

Figure 1C:
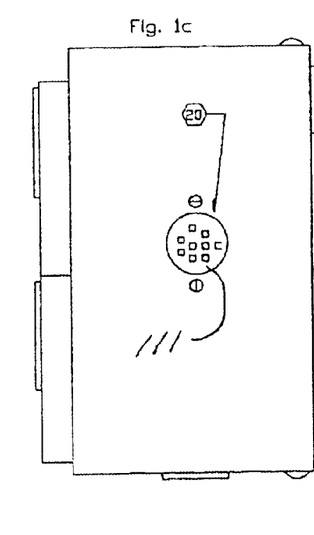
FIG. 1c is a side view of the switch box control panel illustrating the preferred embodiment of the present invention.

FIG. 1c is a side view of the switch box control panel of the present invention. Shown in this view is an optional miniature DIN connector 20 used for servicing the device.

Figure 2:
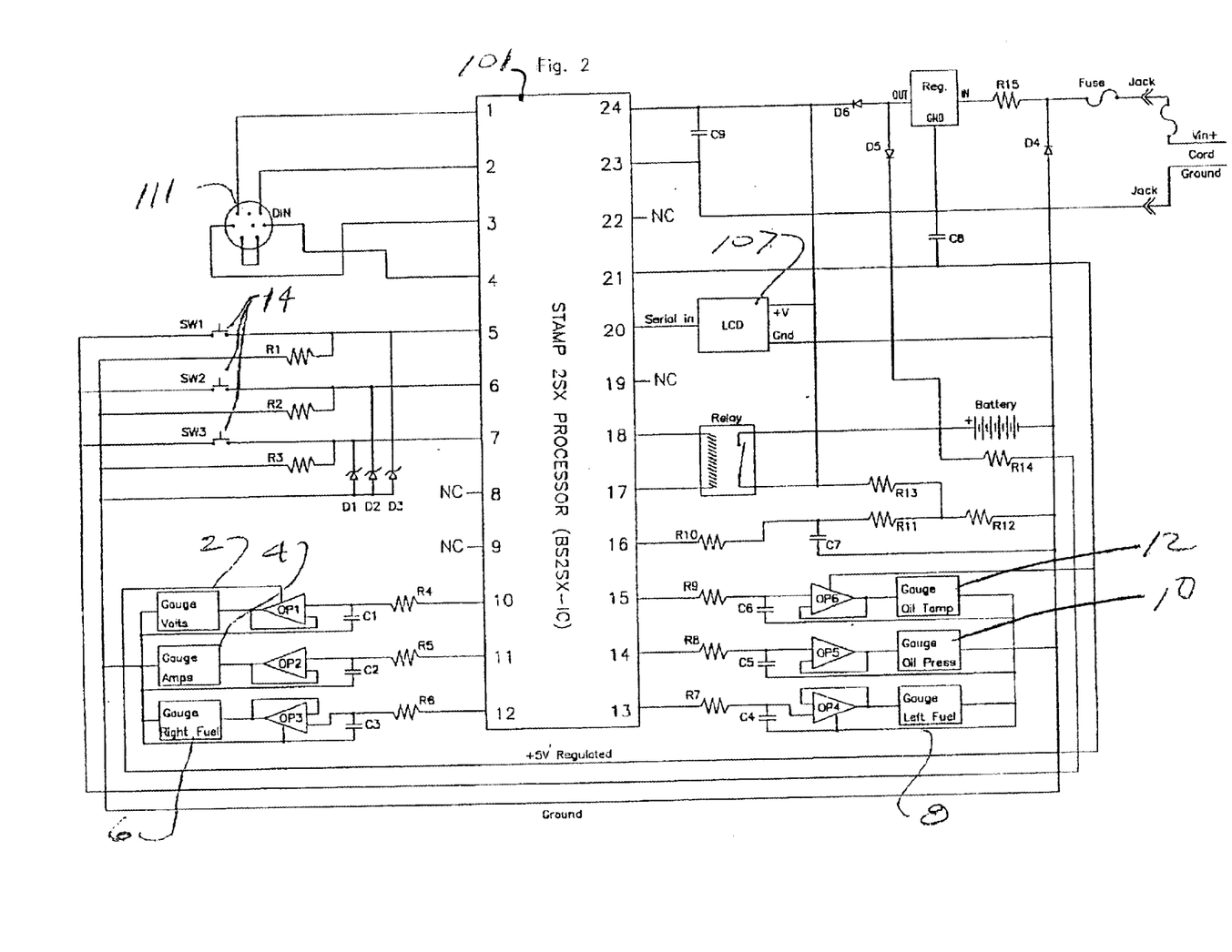
FIG. 2 is a schematic drawing of the device's logic circuit.

FIG. 2 is a schematic drawing of the present invention's logic circuit. This circuit works in conjunction with the flow charted program illustrated in FIGS. 3 through 12 to cause the gauges to display various values based on simulated levels of oil pressure and temperate, fuel levels, voltage, amperes, and pilot input. When the device is used to simulate a malfunction, the logic circuit and program subject the pilot trainee to malfunction indications as predetermined by the flight instructor. Furthermore, when malfunctions involving fuel indications are selected, the logic circuit and program can then evaluate the pilot trainee's response through inputs via the three panel mounted input buttons.

Still referring to FIG. 2, the gauges 2, 4, 6, 8, 10 and 12 are all electrically controlled gauges such that the display value (see FIG. 1a) for each gauge depends upon the electrical output signal provided to the gauge. In order to control the display value of the gauges 2, 4, 6, 8, 10 and 12, the preferred embodiment of the present invention utilizes a microprocessor 101 having a plurality of output lines. These output lines are connected to the gauges 2, 4, 6, 8, 10 and 12 through operational amplifiers such that one output line from the microprocessor 101 controls one gauge 2, and second output line from the microprocessor 101 controls a second gauge 4, and so on for each of the six gauges.

The switches 14 are all connected as input signals to the microprocessor in a standard fashion. The microprocessor 101 further controls an LCD display 107 which enables the trainer, through manipulation of the input switches 14, to select one of a plurality of predefined simulated aircraft malfunctions in a fashion that will be subsequently described in greater detail.

The microprocessor 101 preferably has self-contained memory as well as a self-contained program. An input port 111 is selectively coupled to one or more inputs to the microprocessor 101 to program the microprocessor 101 in the desired fashion. In the preferred embodiment, a stamp 2SX processor forms the processor 101.

Figure 3:
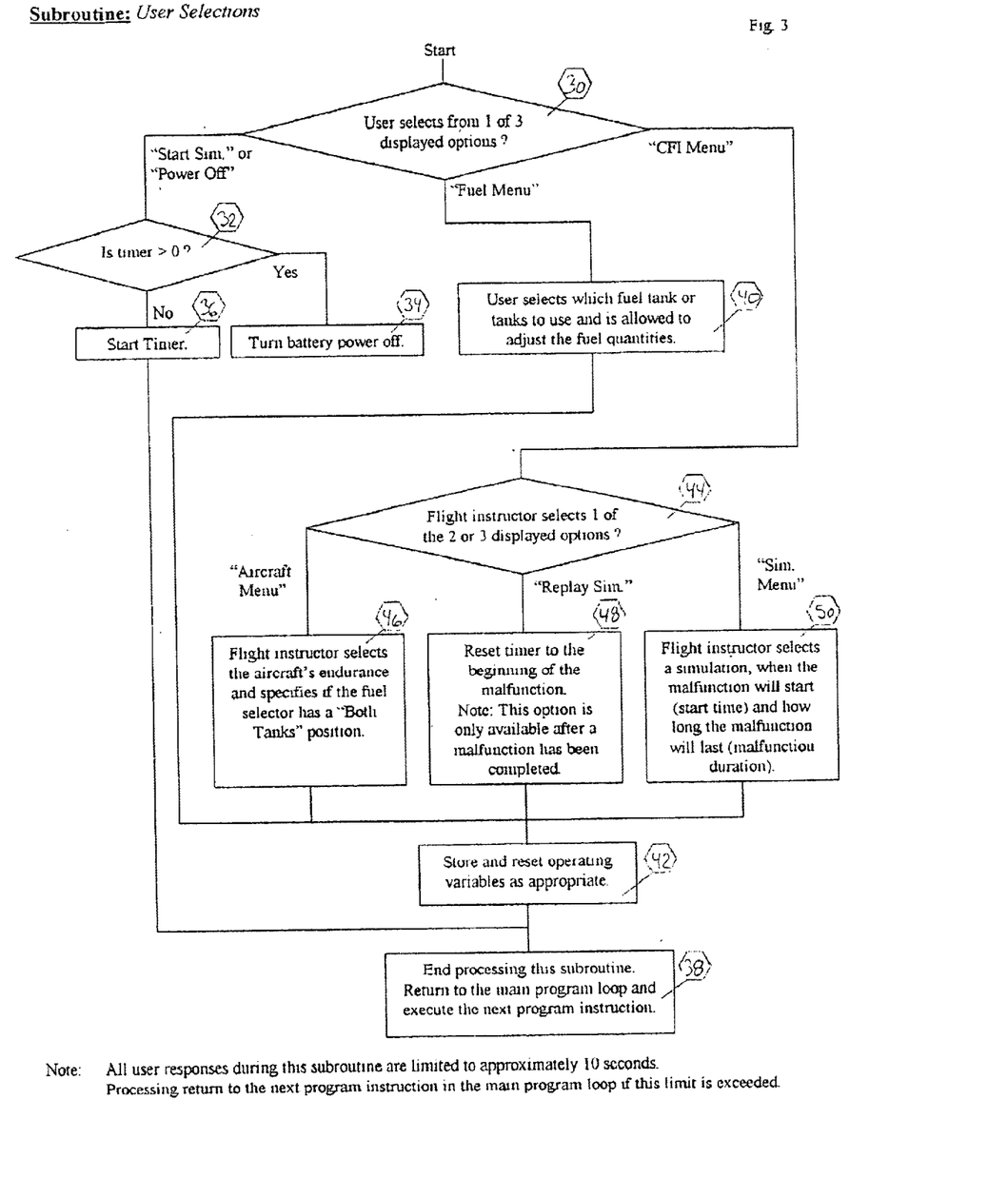
FIG. 3 is a flow chart diagram of the program's "User Selections" subroutine.

FIG. 3 illustrates the "User Selections" subroutine by which the processor requests and inputs several variables to be used in further functions. All user responses during this subroutine are time limited to approximately ten seconds. If this time limit is exceeded, the device recognizes the user is done making selections. The processor then returns to the next program instruction in FIG. 4, the main program loop. The processor begins the "User Selections" subroutine begins at block 30, where the user selects one of three options displayed above the three input buttons.

If the user selects the left input button while at block 30, the device recognizes that the user desires to start a simulation or power off the device. In either case the processor advances to block 32 where it is determined if a simulation has already been started. If the internal timer has a value greater than zero at block 32, the processor advances to block 34 and the internal power supply is turned off. Alternatively, if the internal timer at block 32 has a value of zero, the processor advances to block 36. Block 36 starts the internal timer effecting future calculations of the device. The processor next advances to block 38 for an orderly return to the next program instruction in the main program loop.

If the user selects the center input button while at block 30, the device recognizes that the user desires to make changes via a menu of items related to fuel. The processor then advances to block 40 where the user selects which fuel tank or tanks are to be used in future fuel calculations. Furthermore, block 40 allows the user to adjust fuel levels to match that aboard the training aircraft. After block 40 is completed, the processor then advances to block 42 where operating variables are stored and reset in preparation for returning to the main program loop. After block 42 is completed, the processor advances to block 38 for an orderly return to the next program instruction in the main program loop.

If the user selects the right input button while at block 30, the device recognizes that the user desires to make changes via a menu of items reserved for the certified flight instructor (CFI). The processor then advances to block 44 where the flight instructor selects one of either two or three options displayed above the three input buttons.

If the user selects the right input button while at block 44, the device recognizes the flight instructor's desire to configure the simulator operation to match that of the training aircraft. The processor then advances to block 46 where the flight instructor specifies the aircraft's endurance with full tanks of fuel. Furthermore, block 46 allows the flight instructor to specify if the aircraft's fuel selector has a "Both Tanks" position commonly found only on high wing aircraft. The processor next advances to block 42 where operating variables are stored and reset in preparation for returning to the main program loop. After block 42 is completed, the processor advances to block 38 for an orderly return to the next program instruction in the main program loop.

If a simulation has already been completed by the device, block 44 will provide the flight instructor with the option of replaying the simulation beginning at the onset of the malfunction. This option is executed when the flight instructor selects the center input button while at block 44. The processor then advances to block 48 where the internal timer is reset to the time when the malfunction began. The processor next advances to block 42 where operating variables are stored and reset in preparation for returning to the main program loop. After block 42 is completed, the processor advances to block 38 for an orderly return to the next program instruction in the main program loop.

If the user selects the right input button while at block 44, the device recognizes the flight instructor's desire to make changes via a menu of items related to simulations. Processing then advances to block 50 where the flight instructor specifies what simulation is desired, when any associated malfunction indications will start, and how long any associated malfunction indications will last. Additionally, if the flight instructor selects the device to only supply normal gauge indications, questions regarding malfunctions will be conveniently bypassed. Processing next advances to block 42 where operating variables are stored reset in preparation for returning to the main program loop. After block 42 is completed, processing advances to block 38 for an orderly return to the next program instruction in the main program loop.

Figure 4:
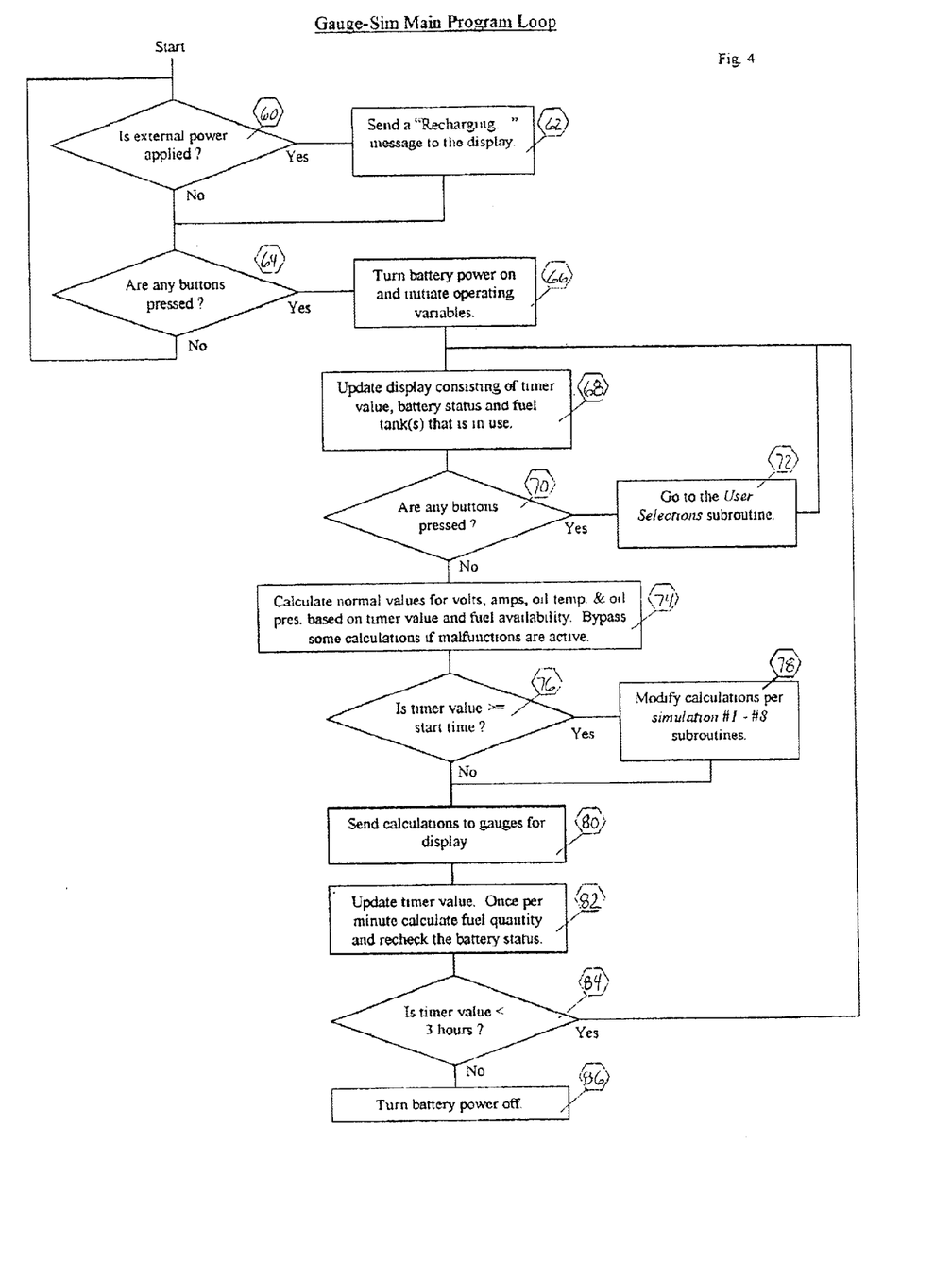
FIG. 4 is a flow chart diagram of the program's "Main Program Loop" routine.

Referring now to FIG. 4, the main program loop, the processor begins at block 60 where the device determines if power is applied to the previously described coaxial power jack 18 (see FIG. 1b). If external power is applied, the processor advances to block 62 and a recharging message is sent to the liquid crystal display. The processing advances next to block 64 regardless of external power being applied or not.

Block 64 checks to see if any of the three input buttons are pressed. If no buttons are pressed, the processor returns to block 60. Alternatively, if any one of the three inputs buttons are pressed, the processor will advance to block 66. At block 66 the internal power supply will be turned on and operating variables will be initiated. Furthermore, block 66 will initiate certain operating variables to values retrieved from memory storage.

The processor next advances to block 68 where the liquid crystal display is updated. This action consists of displaying the value of the internal timer in an hour, minute and second type format. Additionally, the status of the internal battery is displayed in a horizontal bar graph type format followed by an indication of which fuel tank or tanks are currently in use by the simulator. Upon sending the above information to the liquid crystal display, the processor next advances to block 70.

Block 70 checks the three input buttons to determine if any of them are pressed. If in fact any one of the buttons is pressed, the device recognizes that the user's desire to perform the previously described "User Selections" subroutine. If in fact this is the case, the processor proceeds next to block 72 where the "User Selections" subroutine is called. Alternatively, if block 70 determines that none of the three input buttons are pressed, the processor will advance to block 74.

Appropriate readings for the oil pressure gauge 2, oil temperature gauge 4, voltmeter 10, and ammeter 12 are calculated at block 74 based on the value of the internal timer and fuel availability. The gauges are subsequently adjusted to reflect these calculations later in the main program loop. Some of the calculations in block 74 are bypassed when the simulator is providing indications of a malfunction.

At block 76 the processor determines from the instructor's input whether it is appropriate to begin simulating one of the eight malfunctions. If such action is appropriate, the processor moves to block 78 where the desired malfunction's subroutine is preformed before the processor advances to block 80. Alternatively, if it is not appropriate to begin any of the eight malfunctions, the processor advances directly to block 80.

At block 80, all of the gauges are adjusted based on previous calculations up to this point.

The processor then moves on to block 82, where the internal timer is updated. Additionally, once per minute the processor will calculate how much fuel each fuel gauge should be indicating and the processor will check the status of the internal battery. The calculations from block 82 will be displayed later in block 68.

The processor next proceeds to block 84 where it is determined if the internal timer has less than three hours on it. If this is in fact the case, the processor will return to block 68 and function as previously described. Alternatively, if the internal timer is greater than or equal to three hours, the processor proceeds to block 86 where the internal power supply is turned off.

Figure 5:
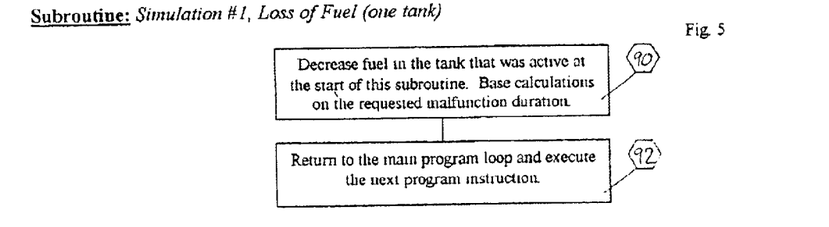
FIG. 5 is a flow chart diagram of the program's "Loss of Fuel (one tank)" subroutine.

With reference now to FIG. 5, the "Loss of Fuel (one tank)" subroutine is shown, by which the present invention simulates a loss of a portion of the aircraft's fuel supply due to a leak or other irregularity. When the "Loss of Fuel (one tank)" subroutine is called upon, the processor begins at block 90, at which the quantity of simulated fuel in the active fuel tank is reduced at a rate determined by the malfunction duration previously entered by the flight instructor. This reduction continues until all of this tank's fuel has been removed, and is reflected on the appropriate fuel gauge. Finally, the processor advances to block 92, where it subsequently returns to the main program loop at the point at which it called for the "Loss of Fuel (one tank)" subroutine.

Figure 6:
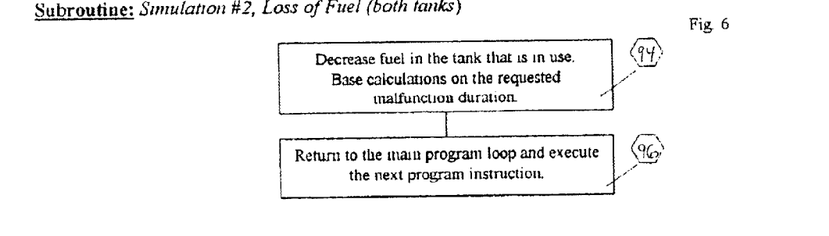
FIG. 6 is a flow chart diagram of the program's "Loss of Fuel (both tanks)" subroutine.

With reference now to FIG. 6, the "Loss of Fuel (both tanks)" subroutine is shown, by which the present invention simulates a loss of all of the aircraft's fuel supply due to a leak or other irregularity. When the "Loss of Fuel (both tanks)" subroutine is called upon, the processor begins at block 94, at which the quantity of simulated fuel in the active fuel tank is reduced at a rate determined by the malfunction duration previously entered by the flight instructor. This reduction continues until all of the aircraft's fuel has been removed, and is reflected on the fuel gauges. Finally, the processor advances to block 96, where it subsequently returns to the main program loop at the point at which it called for the "Loss of Fuel (both tanks)" subroutine.

Figure 7:
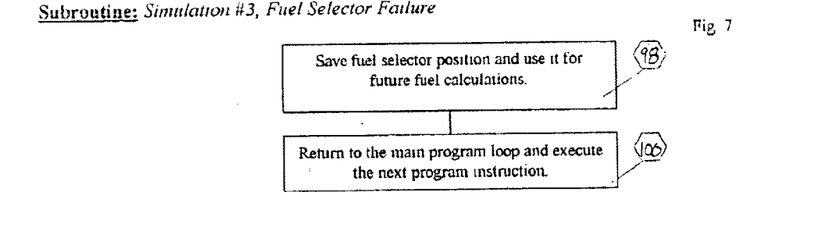
FIG. 7 is a flow chart diagram of the program's "Fuel Selector Failure" subroutine.

With reference to FIG. 7, the "Fuel Selector Failure" subroutine is illustrated. When the "Fuel Selector Failure" subroutine is called upon, the processor goes to block 98. At block 98 the current setting for the fuel tank being used is read into memory for all future fuel calculations. For the duration of this malfunction, any changes to the fuel tank selected will have no effect. The processor then advances to block 100, where it subsequently returns to the main program loop at the point at which it called for the "Fuel Selector Failure" subroutine.

Figure 8:
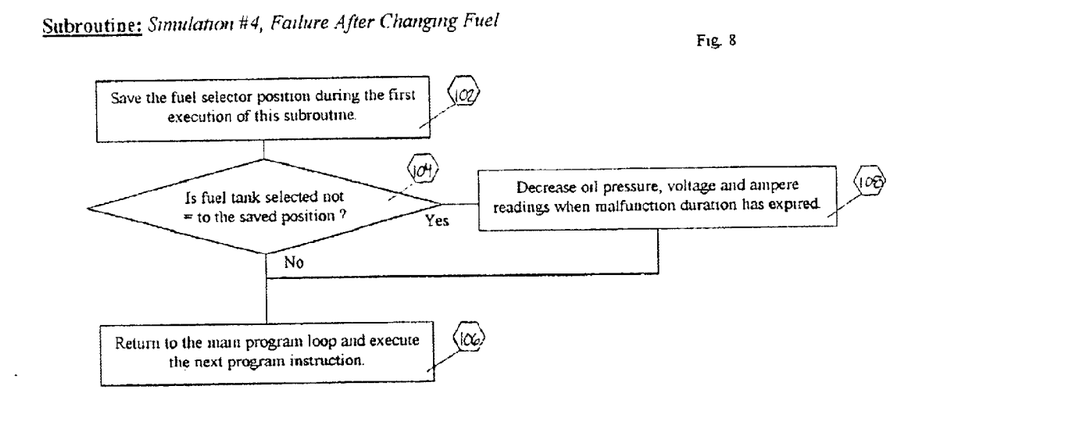
FIG. 8 is a flow chart diagram of the program's "Failure After Changing Fuel" subroutine.

FIG. 8 illustrates the "Failure After Changing Fuel" subroutine. When the "Failure After Changing Fuel" subroutine is called upon, the processor begins at block 102. At block 102 the processor saves into memory the fuel selector's setting at the start of this subroutine. The processor then advances to 104, where it is determined if the user has changed the fuel tank selection. If in fact the two values are equal, the fuel selector has not been moved and processing advance to block 106. At block 106 processing subsequently returns to the main program loop at the point at which it called for the "Failure After Changing Fuel" subroutine.

Alternatively, if the values compared in block 104 are found to be unequal, meaning the fuel selector has been moved, the processor will advance to block 108. At block 108 values for oil pressure, voltage and amperes will be decreased after the malfunction duration time has expired. The processor then continues to block 106 where it returns to the main program loop as previously described.

Figure 9:
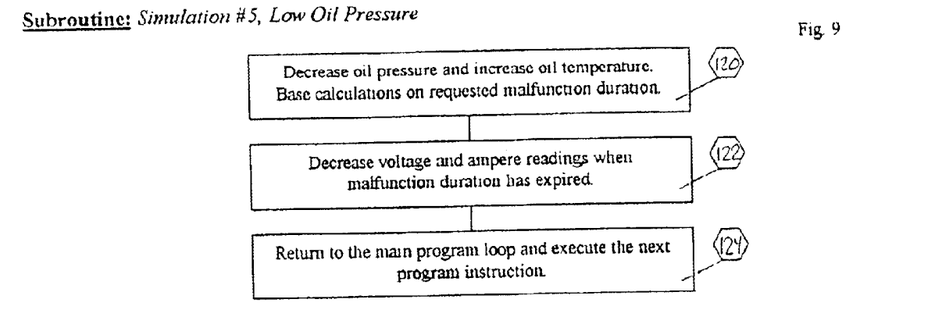
FIG. 9 is a flow chart diagram of the program's "Low Oil Pressure" subroutine.

Now referring to FIG. 9, the "Low Oil Pressure" subroutine is shown. Upon the "Low Oil Pressure" subroutine being called, the processor begins at block 120, where the simulated oil pressure is decreased, while the simulated oil temperature is increased, both at rates determined by the malfunction duration as previously entered by the flight instructor. The changes in oil pressure and oil temperature are reflected on the oil pressure gauge 2 and oil temperature gauge 4 respectively. The processor then continues to block 122, where the readings on the voltmeter 10 and ammeter 12 are reduced once the malfunction duration has expired. The processor finally advances to block 124 where it subsequently returns to the main program loop at the point at which it called for the "Low Oil Pressure" subroutine.

Figure 10:
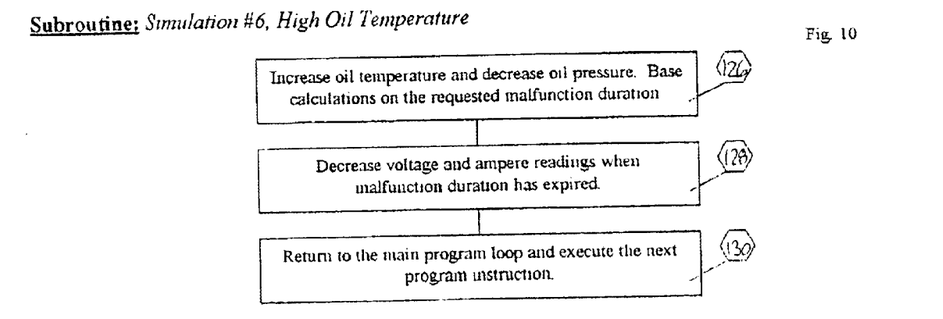
FIG. 10 is a flow chart diagram of the program's "High Oil Temperature" subroutine.

Now referring to FIG. 10, the "High Oil Temperature" subroutine is illustrated. Unacceptably high oil temperature provides similar indications as those of low oil pressure. Upon the "High Oil Temperature" subroutine being called, the processor begins at block 126, where the simulated oil pressure is decreased, while the simulated oil temperature is increased, both at rates determined by the malfunction duration as previously entered by the flight instructor. The changes in oil pressure and oil temperature are reflected on the oil pressure gauge 2 and oil temperature gauge 4 respectively. The processor then continues to block 128, where the readings on the voltmeter 10 and ammeter 12 are reduced once the malfunction duration has expired. The processor finally advances to block 130 where it subsequently returns to the main program loop at the point at which it called for the "High Oil Temperature" subroutine.

Figure 11:
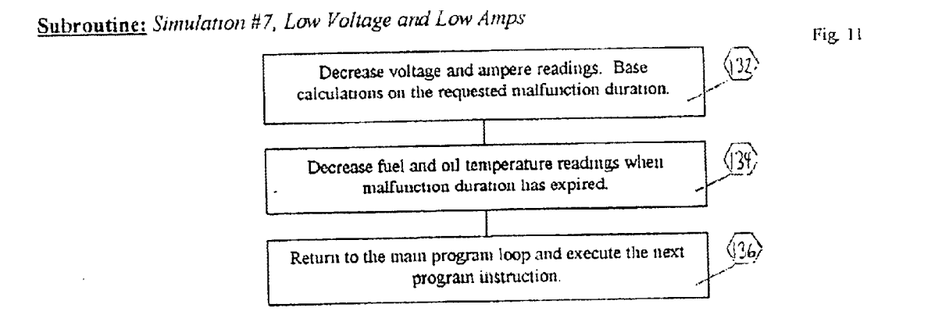
FIG. 11 is a flow chart diagram of the program's "Low Voltage and Low Amps" subroutine.
Figure 12:
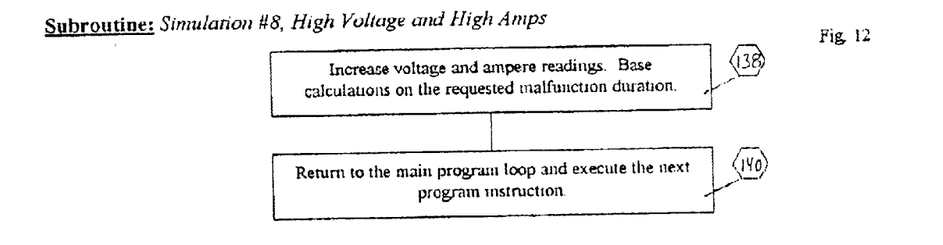
FIG. 12 is a flow chart diagram of the program's "High Voltage and High Amps" subroutine.

With reference now to FIG. 11, the "Low Voltage and Low Amps" subroutine is shown. The processor begins this subroutine at block 132, where it decreases the voltage and amperage values at a rate consistent with the selected malfunction duration. These decreases are reflected by the readings of the voltmeter 10 and ammeter 12. The processor then advances to block 134. At block 134 the values for oil temperature gauge 4, left fuel 6, and right fuel 8 will be decreased after the malfunction duration time has expired. The processor then advances to block 136, where it subsequently returns to the main program loop at the point at which it called for the "Low Voltage and Low Amps" subroutine.

Finally, referring to FIG. 13, the "High Voltage and High Amps" subroutine is shown. The processor begins this routine at block 138, where it increases the voltage and amperage values at a rate consistent with the malfunction duration. These increases are reflected by the readings on the voltmeter 10 and ammeter 12. The processor then advances to block 140, where it subsequently returns to the main program loop at the point at which it called for the "High Voltage and High Amps" subroutine.

Having described my invention, however, many modifications thereto will become apparent to those skilled in the art to which it pertains without deviation from the spirit of the invention as defined by the scope of the appended claims.

I claim:
1. A gauge simulator for use in conjunction with pilot training comprising:
   a housing,
   a plurality of electrically controlled gauges mounted to said housing, each said gauge having a variable display value corresponding to an aircraft condition;
   a processor contained in said housing, said processor having outputs electrically connected to said gauges for controlling the display value of each said gauge, said processor being programmed to simulate gauge display values corresponding to predefined malfunctions of an aircraft; and
   means mounted to said housing and electrically connected to said processor for varying the time duration from initiation of a simulation and before initiation of the simulated malfunction.
2. The invention as defined in claim 1 wherein one of said gauges simulates oil pressure.
3. The invention as defined in claim 1 wherein one of said gauges simulates oil temperature.
4. The invention as defined in claim 1 wherein at least one of said gauges simulates fuel tank level.
5. The invention as defined in claim 1 wherein one of said gauges simulates battery voltage.
6. The invention as defined in claim 1 wherein one of said gauges simulates battery amperage.
7. The invention as defined in claim 1 and comprising an input switch for preselecting one of said predefined malfunctions.
8. The invention as defined in claim 1 wherein said processor comprises a microprocessor.
9. The invention of claim 4 wherein two of said gauges simulate fuel tank levels.

* * * * *